United States Patent [19]

Jones

[11] Patent Number: 4,810,010
[45] Date of Patent: Mar. 7, 1989

[54] COMPOSITE TUBING CONNECTOR ASSEMBLY

[75] Inventor: Darrell L. Jones, Ojai, Calif.

[73] Assignee: Vetco Gray Inc., Houston, Tex.

[21] Appl. No.: 830,155

[22] Filed: Feb. 18, 1986

[51] Int. Cl.$^4$ ............................................. F16L 39/02
[52] U.S. Cl. ........................................ 285/55; 285/149; 285/353; 285/250; 285/387; 285/334
[58] Field of Search ................. 285/55, 353, 387, 915, 285/250, 149, 384, 334

[56] References Cited

U.S. PATENT DOCUMENTS

| | | | |
|---|---|---|---|
| 579,986 | 4/1897 | Jordan | 285/353 X |
| 1,883,086 | 10/1932 | Swartz | 285/55 X |
| 2,359,952 | 10/1944 | Welger | 285/55 |
| 2,408,960 | 10/1946 | Stivason | 285/55 X |
| 2,599,389 | 6/1952 | Hume | 285/353 X |
| 2,766,999 | 10/1956 | Watts et al. | |
| 3,047,937 | 8/1962 | De Vecchi | 285/55 X |
| 3,181,896 | 5/1965 | Russell | 285/15 |
| 3,338,598 | 8/1967 | Kurtz | 285/55 |
| 3,399,908 | 9/1968 | Kurtz | 285/55 |
| 3,679,237 | 7/1972 | De Angelis | 285/387 X |
| 4,062,572 | 12/1977 | Davis | 285/55 |
| 4,094,536 | 6/1978 | Cole et al. | 285/353 X |
| 4,107,452 | 8/1978 | Razvi | 285/55 X |
| 4,132,382 | 1/1979 | Jackson | 285/55 X |
| 4,537,426 | 8/1985 | Carter, Sr. | 285/915 X |
| 4,548,428 | 10/1985 | Ruhle | 285/90 |
| 4,647,078 | 3/1987 | Lundy | 285/149 |

FOREIGN PATENT DOCUMENTS 656942 1/1963 Canada .................................. 285/55

Primary Examiner—Thomas F. Callaghan
Attorney, Agent, or Firm—Joseph R. Dwyer

[57] ABSTRACT

Composite tubing connector assemblies (10, 10a) comprising elongated tubes (14, 14a) of composite material, with liners (12, 12a) and with the tube having upsets (16, 16a) formed by compression rings (20, 20a) located near each end of the composite tubes and end fittings such as a connector pin (22) and connector box (24) positioned over the upsets (16, 16a) and locked in place by split nuts (26, 26a), pressing the upsets (16, 16a) against the compression rings (20, 20a) within the end fittings. When coupled together in end-to-end relationshiop, a seal ring (26) is placed between the assemblies (10, 10a) to form a liner-to-liner seal. This arrangement allows the composite tube (14) to be formed and the end fittings (22, 24) coupled thereto at a later date, if desired.

7 Claims, 2 Drawing Sheets

COMPOSITE TUBING CONNECTOR ASSEMBLY

RELATED APPLICATION

U.S. application for patent entitled "Composite Pipe Assembly" of Darrell L. Jones, filed Feb. 18, 1986 Ser. No. 830,156, now abandoned in favor of a continuation application Ser. No. 032,931 filed Mar. 27, 1987.

BACKGROUND OF THE INVENTION

This invention is directed to an improvement in tubular members or pipes, such as used in the drilling and production of oil and gas wells, by the fabrication and use of composite materials in forming the tubular members and is particularly directed to an improvement in tubular members which, when joined together end-to-end, provides a liner-to-liner seal with a single seal ring.

As pointed out in the Related Application, tubular members, such as risers which are connected together end to end in strings, formed of material other than metal, are known to be old, as shown, for example, in the U.S. Pat. No. 3,768,842 to Ahlstone. This patent utilized fiberglass with metallic end pieces to connect one tubular member to another to form the string of pipe.

The use of fiberglass in other tubular members with metallic end connectors is also shown in the U.S. Pat. No. 3,352,557 to Medney. Attention is directed to FIG. 1 herein which is a reproduction of FIG. 2 including the patent reference numerals of that patent where tubes 11a, 13a of fiberglass material are flared at 15a, 17a by rings 35, 37 pressed into the ends of the tubes and attached thereto. Thereafter, metallic outer collar member 43, 45 were brought together and adhered to the flared ends and a threaded slip collar 49 was threaded thereover to form a joint of the union type. In order to form such a union joint, it is apparent that the outer connector rings for each end of the fiberglass tubing and the collar had to be inserted over the fiberglass tubing before the ends of the fiberglass tubing were flared. Typical also of a union joint, the outer diameter of the joint is considerably larger than the diameter of the fiberglass tubing.

The other figures of this patent show different means of connecting the ends together to form the union joint and FIG. 3 shows a gasket 51 at the joint. Reference to the patent itself can be made if more detail is thought necessary. FIG. 2 was selected simply because it was representative of the teachings of the patent and because it showed the threaded coupling 49.

This invention is directed to a composite tubing connector assembly in which a liner of a selected material, such as an elastomeric or thermoplastic material, is formed on a mandrel, then a tube of composite material is formed over the liner with flared ends (upsets) formed at the time of forming the tube. The conventional continuous process of forming the composite tubes may be used. Then, using a split lock ring in conjunction with the upsets, pipe end fittings, such as metal connector box and pins of the type used in the oil and gas industry, may be used as coupling members to form the composite tubing connector assembly. The end fittings may be bonded to the composite tube with a suitable adhesive, if desired. This bonding helps seal the composite tubes in the area of the end fittings and aids in load distribution, if the latter is critical. Too, with such box and pin connectors, only one layer of metal thickness exists radially outwardly of the outer surface of the composite tube as distinguished from the prior art union-type joint.

Utilizing the teachings of this invention, lined composite tubing connector assemblies of one-half to one inch wall thickness and thicker from 20 to 100 feet long are feasible. Also utilizing the teachings of this invention, the lined composite tubing with the upsets may be formed of any suitable length and stored for later connection to standard end fittings of any selected type. The reason for the latter is that the end fittings are not needed to be on the composite tubing at the time of formation, as in the prior art. Also the end fittings may be reused on other composite tubes should the latter malfunction for whatever reason. Whether or not the end fittings are bonded to the composite tubes when possible reuse is contemplated is a matter of choice.

SUMMARY OF THE INVENTION

A composite tubing connector assembly of this invention comprising a lined elongated tube of composite material with the tube ends upset by compression rings located near each end of the composite tube and end fittings, such as a connector pin and connector box, positioned over the upsets and locked in place by split nuts, pressing the upsets against the compression rings within the end fittings. The liner for the composite tube extends the length of the tube and, when the end fittings are joined, a seal ring is placed between the ends of the lined composite tubes, providing a liner-to-liner seal. This arrangement also allows the lined composite tube to be formed and the end fittings coupled thereto at a later date, if desired. The bonding of the end fittings to the tube ends is optional.

DETAILED DESCRIPTION

Figure 1:
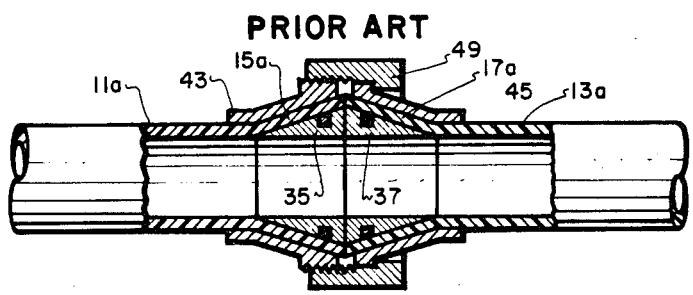
FIG. 1 is a view, partly in section, of the tubular member of the prior art coupled together as previously described in the Background, supra.
Figure 2:
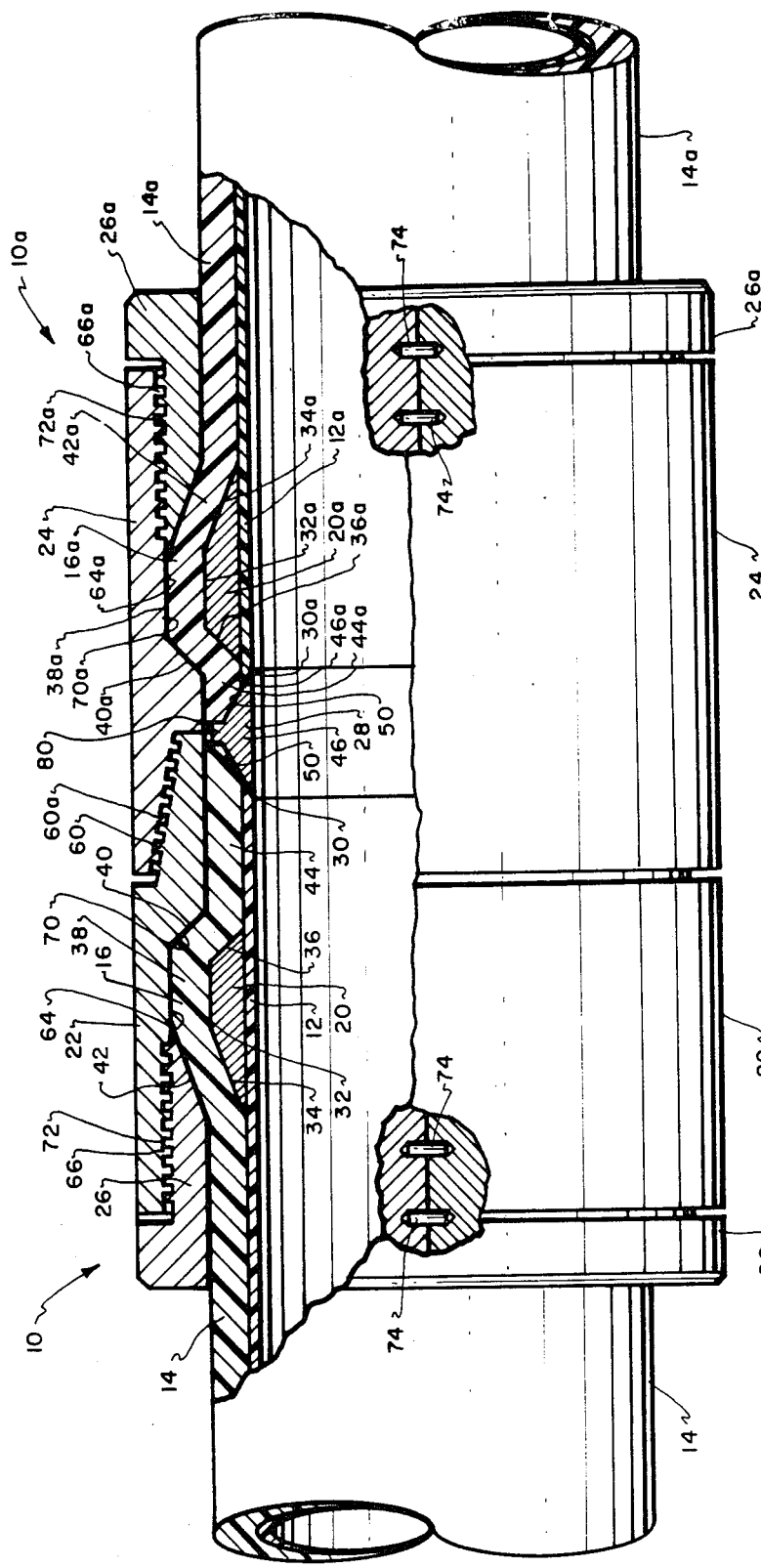
FIG. 2 is an elongated sectional view of two composite tubing connector assemblies constructed according to the teachings of this invention and coupled together.

Turning first to FIG. 2, since FIG. 1 was previously described, there is shown two composite tubing connector assemblies 10 and 10a coupled together comprising; long inner thermoplastic liners 12 and 12a, long composite tubes 14 and 14a with upsets 16 and 16a formed over compression rings 20 and 20a located near the ends of the composite tubes 14 and 14a, a connector pin 22 at one end of one composite tube 14 and a connector box 24 at the other end of the other composite tube 14a, and a pair of split lock nuts 26 and 26a locking the ends of the composite tubes 14 and 14a within the connector pin 22 and box 24, respectively, and a seal ring 28 between the coupled tubing connector assemblies 10 and 10a.

The liners 12 and 12a extend the full length of the composite tubes 14 and 14a and are chamfered at 30 and 30a. The liners 12 and 12a may be made of any suitable thermoplastic material, preferably of low permeability compared to the composite material such as PVC or PVDF, depending on the end use of the composite tubing connector assembies 10 and 10a. As is conventional, a suitable adhesive will be used to bond the liners 12 and 12a to the inner cylindrical wall of the composite tubes.

The compression rings 20 and 20a, are formed either of composite material or metal and, as shown, are placed over the liners 12 and 12a and each have a flat cylindrical center portion 32 and 32a and two tapers 34, 34a and 36, 36a, which taper, respectively, towards the center of the composite tubes and toward the ends of the composite tubes 14 when positioned as shown in FIG. 2 to form the upsets on the composite tubes 14 and 14a. These compression rings increase the hoop stiffness of the composite tube to withstand the collapse pressure exerted by the split locking rings 26 and 26a. In the formation of the composite tubes, the compression rings 20 and 20a are slipped over the liners 12 and 12a before the composite material is wound on the liner 12 and 12a and mandrel (not shown). The upsets 16 and 16a each have a central cylindrical surface 38 and 38a and two tapered surfaces 40, 40a and 42, 42a, conforming to the shape of the compression rings 20 and 20a. Since the compression rings 20 and 20a are spaced from the ends of the composite tubes 14 and 14a, the composite tubes have cylindrical portions 44 and 44a at the end terminations of the tubes. The cylindrical portion 44a is shorter than the cylindrical portion 44. The inner ends of these terminations are chamfered as at 46 and 46a, in line with the chamfers 30 and 30a on the liner, to mate with tapered walls 50 of the seal ring 28. The manner of forming the composite material and the material itself are conventional and taught in a number of patents as, for example, in the U.S. Pat. No. 3,156,489 to Derringer and the U.S. Pat. No. 3,002,534 to Noland. The precise method of forming the composite tubes 14 and 14a and liners 12 and 12a does not form part of this invention and will not be described in detail except to note, first, that the method of forming may be a continuous process and, second, that the compression rings 20 and 20a form the upsets 16 and 16a before winding and curing and, thus, there are no residual loads on the upsets.

After the formation of the composite tubes 14 and 14a into the desired length, the assembly is completed by positioning the connector pin 22 and connector box 24 over the respective ends of the composite tube.

The connector pin 22 is provided with tapered outer threads 60 which mate with the external tapered threads 60a of the connector box 24. The threads 60 and 60a are conventional and are the type used to make up strings of tubular members as a riser in the oil and gas well industry. About midway of the pin and box and in the direction of the composite tubes 14 and 14a, both the pin and box are identical and each have counterbore 64 and 64a which also has internal threads 66 and 66a. In this embodiment, each counterbore terminates in a conical shoulder 70, 70a which engage the tapers 40 and 40a on the composite tubes. The respective diameters of the counterbores 64 and 64a are such that the composite tubes in the area of the upsets 16 and 16a may accommodate the split locking nuts 26 and 26a. Too, as mentioned previously, the pin and box may be bonded to the composite tubes by applying an adhesive between the counterbores 64 and 64a and the area of the upsets between the split locking nuts 26 and 26a and the end of the composite tubes 14 and 14a. This bonding aids in sealing against leakage near the end of the composite tube and distribute loads imposed on the end fittings. If sealing and loading are not critical, this latter bonding may be omitted. The locking nuts 26 and 26a are externally threaded as at 72 and 72a and inserted into the counterbores 64 and 64a. The areas of the upsets and compression rings complement the cylindrical counterbores as can be clearly seen in FIG. 2.

Figure 3:
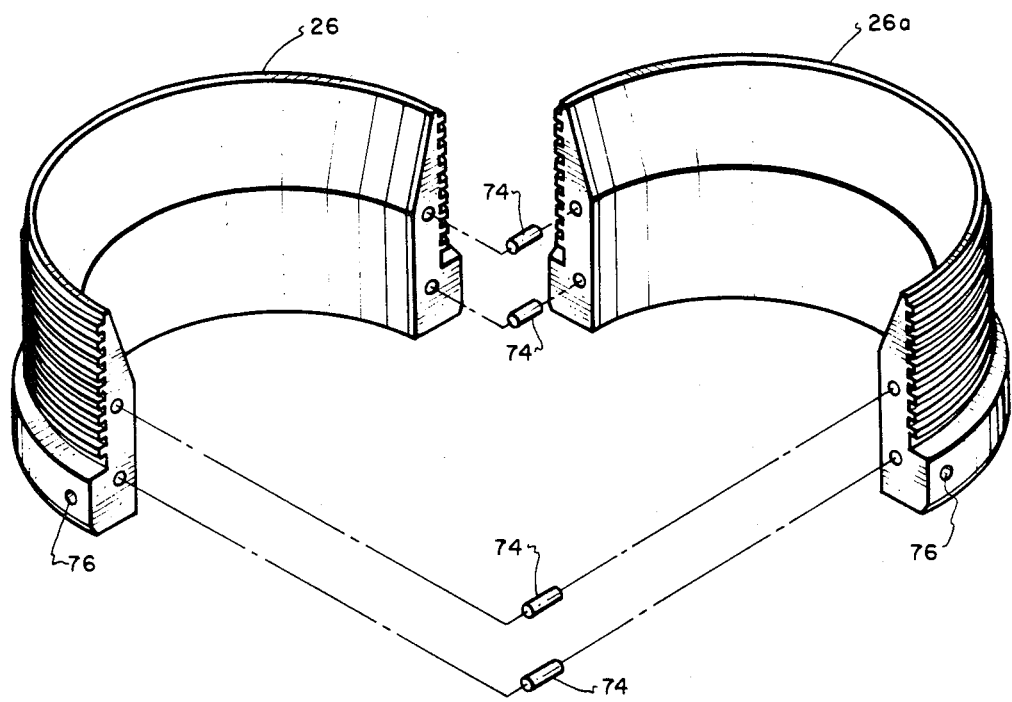
FIG. 3 is an isometric view of one of the split nuts for locking the end fittings to the lined composite tubes.

As more clearly seen in FIG. 3, each of the split locking nuts 26 and 26a are made in two pieces in order to be placed over the previously formed composite tube pipe and, when brought together, is precisely aligned by alignment pins 74 in the known manner, and then rotated and threaded into the connector pin 22 and box 24 by any suitable means such as a spanner wrench. Suitable spanner wrench holes 76 may be provided.

Finally, when the pin and box are joined as shown in FIG. 2, the seal ring 28 is placed therebetween. This seal ring may be of the same material as the liners 12 and 12a and the tapered walls 50 mate with the chamfers 46 and 46a of the composite tubes and 30 and 30a of the liners. The seal ring also has a radially inwardly extending rim 80 which extends between the terminations of the composite tubes; the latter being foreshortened to accommodate this rim when the pin and box are fully made up.

As mentioned above, the counterbore 64 of the connector pin 22 is identical with the counterbore 64a of the connector box 24 and differs from the connector pin only in the fact that external tapered threads are formed on the end to mate with a connector pin. Also, as is conventional, a connector pin may be placed on each end of the composite tube or a connector box may be placed on each end of the composite tube depending on the desires of the user.

From the foregoing, it can be seen that a composite tubing connector assembly is formed and has the desirable features of:

when joined with another composite tubing connector assembly a seal comprising liner-to-liner seal is formed with only one seal ring, having no residual loads on the upsets, it can be formed of thicker walls and larger tube diameters, it can use any standard end pipe fittings, outside of the upset there is only one wall thickness to minimize the metal diameter of the connector pin and connector box, and the end fittings are fitted on the lined composite tubes after formation so that the lined composite tubes may be fabricated and stored and the end fittings placed on the lined composite tubes at any convenient time.

I claim:

1. A composite tubing connector assembly comprising, a liner of a selected length, an elongated tube of essentially the same length as the liner and of composite material, upsets formed spaced from each end of said composite tube which upsets are of a diameter greater than the diameter of the remainder of the tube, the ends of the composite tube and liner having means to accept a seal ring when another composite tubing connector assembly is coupled in end-to-end relationship, compression rings within the upsets, means forming end fittings telescoped over each upset and compression rings and engaging the upset on the end side of the composite tube, and means locking each end fitting to said composite tube located within the end fitting and engaging said upsets and forcing the upsets against said compression rings by pulling said end fittings longitudinally of the cmposite tube.

2. The composite assembly as claimed in claim 1 wherein said end fittings have threaded counterbores and wherein said locking means comprises a split nut capable of being placed over the composite tube and threaded into said counterbore.

3. The composite assembly as claimed in claim 1, characterized by having only a single layer of end fitting telescoped over and radially outward of said composite tube.

4. The composite assembly as claimed in claim 3 wherein said end fittings are bonded to said composite tube.

5. The combination of:
a first liner of a selected length,
a first elongated tube of essentially the same length as the liner and of composite material,
first upsets spaced from each end of said first composite tube,
the ends of the first composite tube and first liner having means to accept a seal ring,
first compression rings within each of the upsets,
first end fittings telescoped over said first upsets and compression rings, and
means locking each of said first end fittings to said composite tube located within the end fittings and engaging said upsets and forcing the latter against said first compression rings by pulling said first end fitting longitudinally of said composite tube, and;
a second composite tubing connector assembly comprising,
a second liner of a selected length,
a second elongated tube of essentially the same length as the liner and of composite material,
second upsets spaced from each end of said second composite tube,
the ends of the second composite tube and second liner having means to accept said seal ring,
second compression rings within each of the upsets,
second end fittings telescoped over said second upsets and compression rings, and
means locking each of said second end fittings to said composite tube located within the end fittings and engaging said upsets and forcing the latter against said second compression rings by pulling said second end fitting longitudinally of said second composite tube,
the end fitting of the first assembly coupled to the end fitting of the second assembly, thus bringing said first and second liners and composite tubes into axial end-to-end relationship, and finally
a seal ring between said coupled first and second end fittings, liners and composite tubes to form a sealed coupling with liner-to-liner sealing.

6. The combination as claimed in claim 5 wherein one of said end fittings is provided with external threads to form a pin connection and the other of said other end fittings is provided with internal threads to form a box connection.

7. A composite tubing connector assembly comprising:
an elongated tube of composite material,
a liner within said composite material terminating slightly short of the ends of said composite tube,
upsets spaced from each end of said composite tube and of a diameter greater than the diameter of the remainder of the composite tube,
the ends of the tube and liner having means to accept a seal ring when another composite tubing connector is coupled in end-to-end relationship,
compression rings within the upsets,
end fittings telescoped over each upset and compression ring and having internal surfaces engagable with the upset on the end side of the composite tube, and
means locking each end fittings to said composite tube and located within the end fittings and engaging the upset on the side opposite the surface of said end fitting and forcing said end fitting and locking means against said upsets compressing the latter against the compression means,
the end fittings having inner bores sufficient to permit removal of said end fittings from said composite tube if desired.

* * * * *